(12) United States Patent
Kuhlman et al.

(10) Patent No.: US 8,362,992 B2
(45) Date of Patent: Jan. 29, 2013

(54) DUAL VIEW DISPLAY SYSTEM USING A TRANSPARENT DISPLAY

(75) Inventors: Frederick F. Kuhlman, Kokomo, IN (US); Andres P. Harbach, Kokomo, IN (US); Richard D. Parker, Tipton, IN (US); Dwadasi H. R. Sarma, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 2 days.

(21) Appl. No.: 12/840,576

(22) Filed: Jul. 21, 2010

(65) Prior Publication Data

US 2012/0019434 A1    Jan. 26, 2012

(51) Int. Cl.
 *G09G 3/36* (2006.01)
(52) U.S. Cl. ............. 345/87; 345/1.1; 345/2.1; 345/89; 345/204
(58) Field of Classification Search ............ 345/76–102, 345/204, 173, 690; 349/62; 359/228, 275
See application file for complete search history.

(56) References Cited

U.S. PATENT DOCUMENTS

| 4,790,636 | A | * | 12/1988 | Carlson | ......................... 359/275 |
| 4,805,996 | A | | 2/1989 | Carlson | |
| 5,115,228 | A | | 5/1992 | Harris et al. | |
| 5,686,979 | A | | 11/1997 | Weber et al. | |
| 6,549,194 | B1 | * | 4/2003 | McIntyre et al. | ............. 345/173 |
| 6,674,504 | B1 | | 1/2004 | Li et al. | |
| 6,999,649 | B1 | | 2/2006 | Chen et al. | |
| 2005/0041009 | A1 | * | 2/2005 | Kuroda | ......................... 345/102 |
| 2005/0253789 | A1 | * | 11/2005 | Ikeda | .............................. 345/76 |
| 2005/0270672 | A1 | | 12/2005 | Feenstra et al. | |
| 2008/0084614 | A1 | | 4/2008 | Dobrusskin | |
| 2008/0174846 | A1 | * | 7/2008 | Morozumi et al. | ........... 359/228 |
| 2008/0218657 | A1 | * | 9/2008 | Hwang et al. | ................... 349/62 |
| 2010/0277439 | A1 | * | 11/2010 | Charlier et al. | ............... 345/176 |

FOREIGN PATENT DOCUMENTS

| EP | 0470032 | 2/1992 |
| EP | 1515181 | 3/2005 |
| JP | 7-218899 | 8/1995 |
| WO | 2004/027489 | 4/2004 |

OTHER PUBLICATIONS

U.S. Appl. No. 12/840,526, filed Jul. 21, 2010.
U.S. Appl. No. 12/852,647, filed Aug. 9, 2010.
U.S. Appl. No. 12/881,242, filed Sep. 14, 2010.
European Search Report dated Sep. 13, 2011.

* cited by examiner

*Primary Examiner* — Quan-Zhen Wang
*Assistant Examiner* — Jennifer Nguyen
(74) *Attorney, Agent, or Firm* — Lawrence D. Hazelton

(57) ABSTRACT

A dual view display system to display two different images in substantially opposite direction using a single transparent display to time-multiplex the images and shutter devices to alternately block each side from being viewed according to the image being displayed.

5 Claims, 3 Drawing Sheets

DUAL VIEW DISPLAY SYSTEM USING A TRANSPARENT DISPLAY

TECHNICAL FIELD OF INVENTION

The invention generally relates to displays for displaying images or information, and more particularly relates to a system that time-multiplexes a single transparent display with different images, and uses light valves or shutter devices to display different images in substantially opposite directions from opposite sides of the transparent display.

BACKGROUND OF INVENTION

Transparent panel type displays capable of being viewed from substantially opposite sides are known. For example, a transparent organic light emitting diode (OLED) type display naturally emits light from both sides of the display. Such displays are available from Samsung, NeoView Kolon, and others. Other examples include transparent electroluminescent (EL) displays and transparent liquid crystal display (LCD). While such displays may be viewed from either side, the image on one side is typically a mirror or reverse image of the opposite side, and so makes the viewing images such as text or asymmetrical objects difficult for the person seeing the mirrored or reversed image.

SUMMARY OF THE INVENTION

Described herein is a dual view display system that uses a single transparent display to display two different images on opposite side of the display system. The projected images are time-multiplexed, and shutter devices on each side of the transparent display are used to allow or block viewing of the display in accordance with the time-multiplexing so that the images viewed on both sides is properly oriented.

In accordance with one embodiment of this invention, a dual view display system 10 for displaying properly oriented images in substantially opposite directions is provided. The system includes a transparent display, a first shutter device, and a second shutter device. The transparent display is configured display a first image oriented for a first side during a first time period and display a second image oriented for a second side opposite the first side during a second time period distinct from the first time period. The first shutter device is configured to allow a view of the first side during the first time period, and block the view of the first side during the second time period. The second shutter device configured to allow a view of the second side during the second time period, and block the view of the second side during the first time period.

In another embodiment of the present invention, the first shutter device is a first liquid crystal device (LCD), and the second shutter device is a second LCD device.

In another embodiment of the present invention, the system includes a touch sensitive surface configured to determine that an object is touching the system to indicate a location in the first image. The system is further configured to indicate a corresponding location on the second image.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
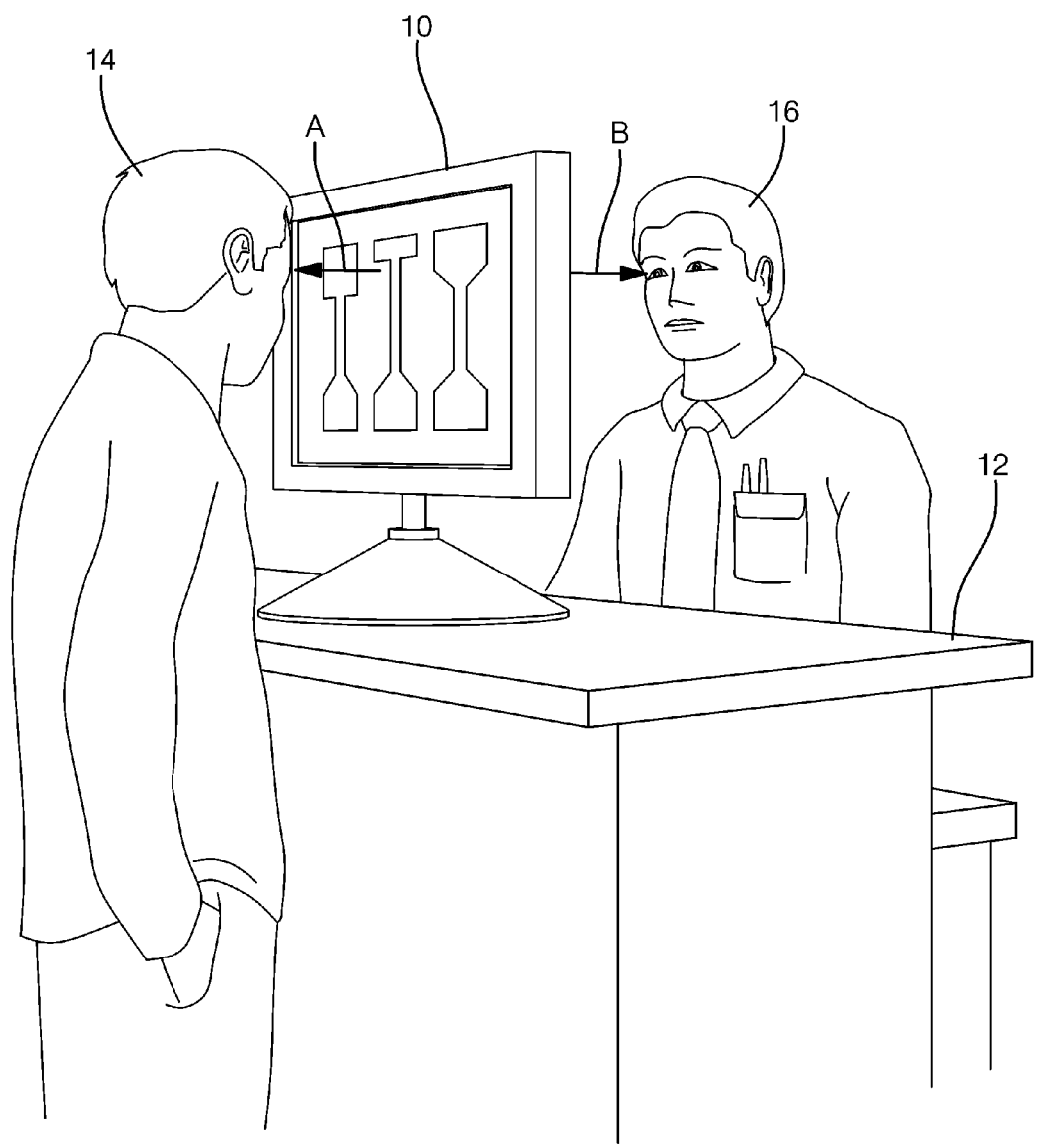
FIG. 1 is a perspective view of an exemplary service counter equipped with a dual view display system in accordance with one embodiment.

In accordance with an embodiment of a dual view display system 10 for displaying properly oriented images in substantially opposite directions A and B, FIG. 1 illustrates a non-limiting example of the system 10 positioned on a service counter 12 at a retail store, for example an automotive parts store. As used herein, displaying properly oriented images means that the dual view display system 10 includes features to overcome the problem of the images on the opposite sides of the transparent display being reversed or mirror images of each other, as will be described in more detail below. The system 10 is configured so that, as illustrated in this example, a customer 14 and a sales person 16 can view information from opposite direction A and B on opposite sides of the dual view display system 10. In some instances, it may be desirable for the customer 14 to view the same information that is viewed by the sales person 16, for example to identify an automotive part the customer 14 wants to purchase. Positioning the dual view display system 10 so that the customer 14 and sales person 16 are both provided with a convenient display avoids inconveniences such as having to share a single view display by swiveling the display back and forth between directions A and B, or the customer 14 and sales person 16 having to lean over the counter 12 toward each other so both can view the single view display from a direction somewhere between directions A and B. Furthermore, it may be desirable for the information on the display viewed by the customer 14 to be a subset of the information on the display viewed by the sales person 16, such as a zoomed in image of an automotive part, or the image displayed to the customer 14 not showing part numbers or stocking information that may be shown to the sales person 16. Other situations where the dual view display system 10 may be useful include displaying to customers (not shown) unrelated information on opposite sides of a retail display such as adjacent isles in a grocery store, or displaying gaming information to opponents (not shown) competing in an interactive video game. It should be apparent that such a dual view display system 10 will be useful to display information to individuals that are interacting in numerous ways, or in situations where there is no interaction between the persons viewing the opposite sides of the dual view display system 10

Figure 2:
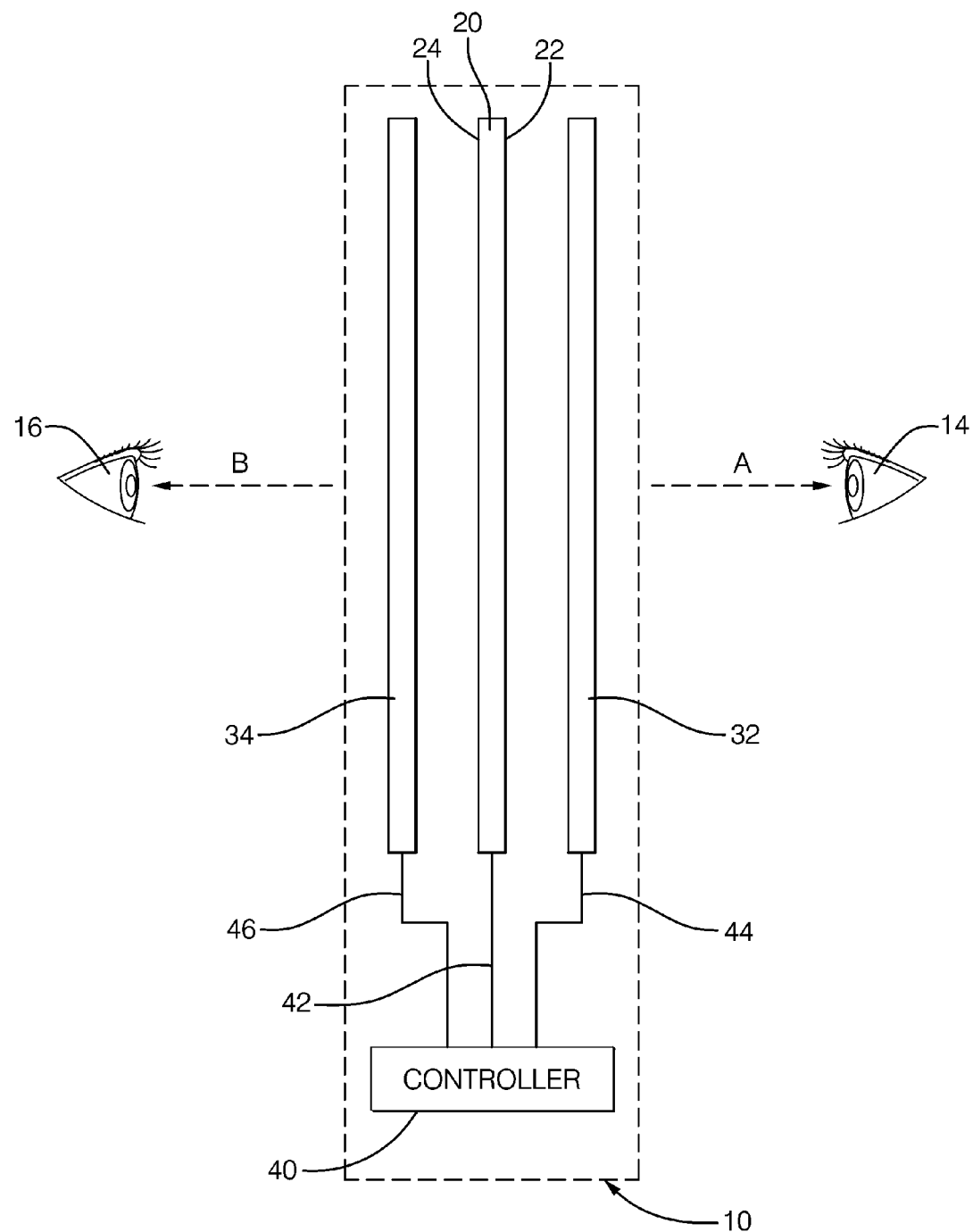
FIG. 2 is a diagram of a multiple view display system in accordance with one embodiment.

FIG. 2 shows a diagram of an embodiment of a dual view display system 10 configured to display a first image in a direction A, and a second image in a second direction B. The first image is preferably oriented for viewing from a first side 22 of the transparent display 20, and the second image is preferably oriented for viewing from a second side 24. By displaying distinct images on opposite sides, the dual view display system 10 may be configured to display distinct images in substantially opposite directions A and B. Providing such a feature may include time-multiplexing the images. Time-multiplexing may include the transparent display 20 displaying a first image oriented for viewing on the first side 22 from the first direction A during a first time period and displaying a second image oriented for viewing on a second side 24 opposite the first side 22 from a second direction B substantially opposite the first direction A during a second time period distinct from the first time period. As used herein, substantially opposite directions A and B means that images are viewed from positions on opposite sides of a plane defined by the dual view display system 10.

To control the viewing of the images on the transparent display 20 such that the images appear to be properly oriented, the dual view display system 10 may include a first shutter device 32 configured to allow a view of the first side 22 from the first direction A during the first time period, and to block or obstruct the view of the first side 22 during the second time period. The dual view display system 10 may also include a second shutter device 34 configured to allow a view of the second side 24 from the second direction B during the second time period, and block the view of the second side 24 during the first time period. The shutter devices 32 and 34 are operated as light valves to transmit or block the propagation of light.

FIG. 2 shows the shutter devices 32 and 34 spaced apart from the transparent display 20 only for the purposes of illustration. It will be recognized by those skilled in the art that the transparent display 20 and the shutter devices may in contact and so minimize the thickness of the dual view display system 10. FIGS. 1-2 depict the transparent display 20 as being flat, however is will be recognized that since flexible transparent display are available, the dual view display system 10 may be curved or otherwise shaped for applications where a non-flat display would be advantageous. FIGS. 1-2 also depict the display areas on opposite sides of the dual view display system 10 as being about equal, however it will be appreciated that the display area on one side could be different that the display area on the other side.

In an embodiment of the dual view display system 10, the shutter devices 32 and 34 may each include a liquid crystal device (LCD). In general, an LCD may be operated to a transparent state or OFF state so that an image displayed by the transparent display 20 may be viewed through the LCD. The LCD may also be operated to an opaque state or ON state so that the image can not be viewed through the LCD. The LCD device may have a single element sized to correspond to the transparent display 20, or may have a plurality of elements so that portions of the transparent display can be independently viewed or blocked from being viewed. In another embodiment, the shutter devices 32 and 34 may be electrowetting type devices operable to a transparent state or an opaque state. In another embodiment, the shutter devices 32 and 34 may be electrochromic glass type devices operable to a transparent state or an opaque state. Other suitable devices for use as shutter devices 32 and/or 34 include an electrically switchable transreflective mirror (ESTM). ESTM's are known devices available from Kent Optronics that are operable to a reflection state whereby light impinging on the ESTM is reflected, and operable to a transparent state whereby light passes though the ESTM. It will be appreciated that the shutter devices 32 and 34 do not need to be the same technology, and so it may be advantageous to have one shutter device be one technology, for example an ESTM, and the other shutter device be a different technology, for example an LCD.

The arrangement of the transparent display 20 and the two shutter devices 32 and 34 illustrated in FIG. 2 suggests that the three components are not integrated in any particular manner, other than just placing them in proximity of each other, to form a two sided display. However the cost of the two sided display arrangement may be reduced and the performance improved by integrally fabricating the two sided display to have the features of the transparent display 20 and the two shutter devices 32 and 34 in a single device. By way of a non-limiting example, such a two sided display may be fabricated by starting with a known transparent display, such as an organic light emitting diode (OLED) display, and then applying additional layers of material to the glass outer surfaces of the OLED display to form the shutter devices. For example, the additional layer of material may be known materials used to form electrowetting cells. Integrally fabricating as two sided display in such a manner is advantageous in that it reduces cost and weight by eliminating redundant layers of glass present when separate components are just placed together, and improves the optical properties of the two sided display by eliminating the potential of an air gap being present between the separate components. It will be appreciated that a shutter device based on electrowetting technology may be a single cell covering the entire area of the two sided display, or multiple cells or pixels capable of selectively blocking portions of the transparent display within the two sided display.

The system 10 may include a controller 40 adapted to provide an image control signal 42 for controlling the time-multiplexing of images shown by the transparent display 20. The controller 40 may also be adapted to provide a first shutter control signal 42 for controlling the first shutter device 32, and a second shutter control signal 46 for controlling the second shutter device 46 in coordination with the images being displayed by the transparent display 20. The controller 40 may include a processor such as a microprocessor or other control circuitry as should be evident to those in the art. The controller 40 may include memory, including non-volatile memory, such as electrically erasable programmable read-only memory (EEPROM) for storing one or more routines, thresholds and captured data. The one or more routines may be executed by the processor to perform steps for providing signals 42, 44, and 46 as described herein.

The shutter control signals 44 and 46 are shown as independent signals since it may be desirable to provide a delay time between one shutter device switching from the transparent state (OFF) to the opaque state (ON) and the other shutter device switching from ON to OFF. This delay time may be desirable so the transparent display 20 can completely update the image before a shutter device is turned OFF so the image can be viewed. Alternatively, the shutter control signals 44 and 46 may be combined into a single signal and any necessary time delays be provided by the shutter devices 32 and 34.

It may also be desirable in some instances for both shutter devices to be turned off so the transparent display can be viewed from both sides simultaneously, even though the view from the first direction A is a mirror image of the view from the second direction B. Such a mode of operation may be useful so one viewer can determine if some detail being displayed is being pointed to by the other viewer. As such, the first shutter device 32 may be further configured to allow a view of the first side 22 during a third time period and the second shutter device 34 may be further configured to allow a view of the second side 24 during the third time period, whereby the first image is a mirror image of the second image. Referring FIG. 1, in such a mode of operation, the customer 14 would see a mirror image of what is seen by the sales person 16.

It may be desirable for the dual view display system 10 to have touch screen capability so the customer 14 or sales person 16 can make a selection or other indication by bringing a pointing device such as an indicator pen or finger tip near to or in contact with the dual view display system 10. As such, the system 10 may include a proximity detector configured to determine that an object such as a finger tip is indicating a location on the dual view display system 10. Such a proximity detector may be an ultrasonic transducer, an infrared detector, a grid of light beams, or a touch sensitive screen. It may also be desirable for the dual view display system 10 to include an indication means configured to provide an indication that a location on one side of the system is being touched or pointed to by providing an indication at a corresponding location on the other side of the system 10.

Figure 3B:
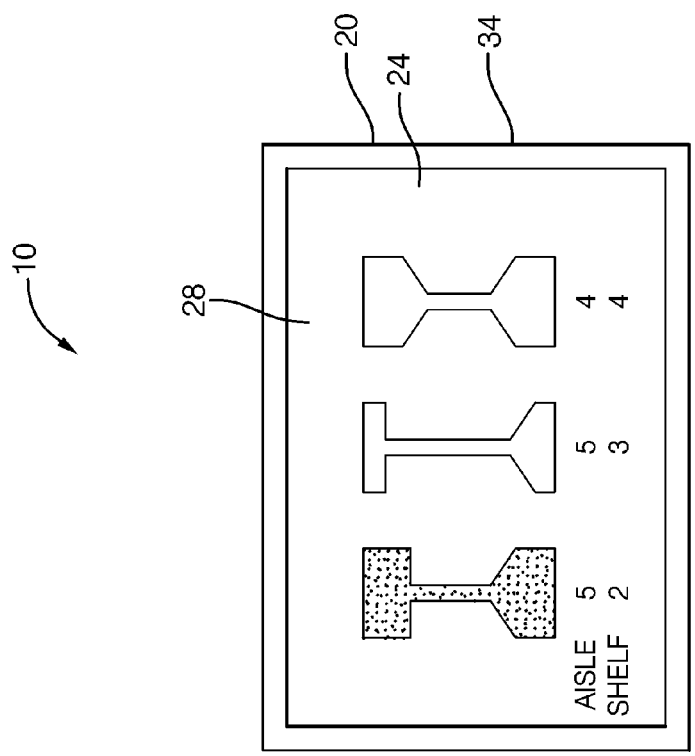
FIGS. 3A and 3B are front and back views of information displayed by the dual view display system of FIG. 1 in accordance with one embodiment.
Figure 3A:
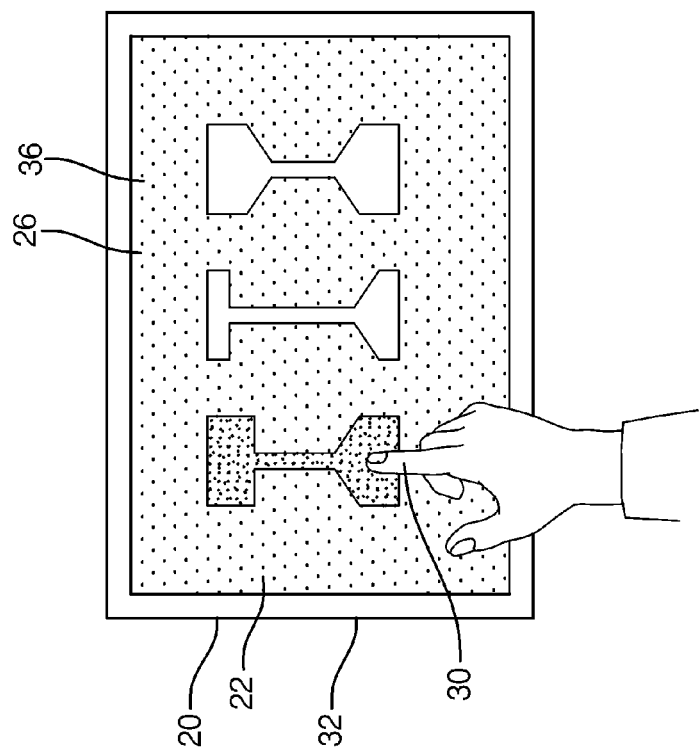

FIG. 3 illustrates an exemplary embodiment of the dual view display system 10 displaying a first image 26 on the first side 22 of the transparent display 20 as viewed through the first shutter device 32 during the first time period, and displaying a second image 28 on the second side 24 of the transparent display 20 as viewed through the second shutter device 34 during the second time period. The exemplary first image 26 shows three different components that the sales person 16 may have selected to display based on the customers verbal description so the customer 14 can make a single selection based on a visual examination of the first image 26.

FIG. 3 also indicates that this exemplary embodiment includes an optional touch sensitive surface 36 configured to determine that an object, such as a fingertip 30, is touching the dual view display system 10 to indicate a location in the first image 26. The illustration indicates that the left component of the three components displayed is being indicated by the fingertip 30 touching the touch sensitive surface 36. In response, the first image 26 may indicate that a location proximate to the left component is being touched by highlighting the left component, for example by changing the color or intensity of the left component on the first image 26. The dual view display system 10 may also indicate a corresponding location on the second image 28. As a non-limiting example, the image 28 shows the left component being highlighted so the sales person 16 can discern which of the three components being displayed is being indicated by the customer. As suggested above, the second image 28 includes additional information for the sales person 16 so that the component selected can be retrieved, for example by providing an aisle number and shelf number where the component is being stored. In another embodiment, the system may indicate the location being touched by displaying an icon such as a circle to indicate the location being touched, without highlighting the entire component being touched.

Accordingly, a dual view display system 10 for displaying properly oriented images in substantially opposite directions is provided. By using a single transparent display 20 and two shutter devices 32 and 34, a system 10 displaying two distinct images is provided for less cost than two separate displays. It will be appreciated that such a system 10 that displays images in substantially opposite directions may be useful for many situations where two persons are interacting while viewing related images, such as when competing with a video game, or explaining what is shown by a medical image (e.g. x-ray, CAT scan). Furthermore, the dual view display system 10 may be equipped with touch sensitive screens so that a person viewing one side of the dual view display system 10 can convey information to another person viewing the opposite side of the dual view display system 10.

While this invention has been described in terms of the preferred embodiments thereof, it is not intended to be so limited, but rather only to the extent set forth in the claims that follow.

We claim:

1. A dual view display system for displaying properly oriented images in substantially opposite directions, said system comprising:
   a transparent display configured display a first image oriented for a first side during a first time period and display a second image oriented for a second side opposite the first side during a second time period distinct from the first time period;
   a first shutter device configured to allow a view of the first side during the first time period, and block the view of the first side during the second time period; and
   a second shutter device configured to allow a view of the second side during the second time period, and block the view of the second side during the first time period,
   wherein the system further comprises a touch sensitive surface configured to determine that an object is touching the system to indicate a location in the first image, said system further configured to indicate a corresponding location on the second image, wherein the corresponding location on the second image is characterized as a mirror image of the location on the first image.

2. The system in accordance with claim 1, wherein the first shutter device comprises a first liquid crystal device (LCD), and the second shutter device comprises a second LCD device.

3. The system in accordance with claim 1, wherein the first shutter device comprises an electrowetting type device, and the second shutter device comprises an electrowetting type device.

4. The system in accordance with claim 1, wherein the first shutter device comprises a first electrochromic glass device, and the second shutter device comprises a second electrochromic glass device.

5. The system in accordance with claim 1, wherein the first shutter device is further configured to allow a view of the first side during a third time period and the second shutter device is further configured to allow a view of the second side during the third time period, whereby the first image is a mirror image of the second image.

* * * * *